US012746492B2

(12) United States Patent
Sim et al.

(10) Patent No.: US 12,746,492 B2
(45) Date of Patent: Sep. 29, 2026

(54) HAIRCARE APPLIANCE

(71) Applicant: Dyson Technology Limited, Wiltshire (GB)

(72) Inventors: Wee Jin Sim, Singapore (SG); Antoine Francois Atkinson, Swindon (GB); Yuankang Liu, Singapore (SG)

(73) Assignee: Dyson Technology LImited, Wiltshire (GB)

( * ) Notice: Subject to any disclaimer, the term of this patent is extended or adjusted under 35 U.S.C. 154(b) by 809 days.

(21) Appl. No.: 17/921,926

(22) PCT Filed: Mar. 29, 2021

(86) PCT No.: PCT/GB2021/050777
§ 371 (c)(1),
(2) Date: Oct. 27, 2022

(87) PCT Pub. No.: WO2021/229203
PCT Pub. Date: Nov. 18, 2021

(65) Prior Publication Data

US 2023/0166205 A1 Jun. 1, 2023

(30) Foreign Application Priority Data

May 15, 2020 (GB) .................................. 2007215.3

(51) Int. Cl.
*B01D 46/00* (2022.01)
*A45D 20/00* (2006.01)
(Continued)

(52) U.S. Cl.
CPC ......... *B01D 46/0005* (2013.01); *A45D 20/00* (2013.01); *B01D 46/009* (2013.01);
(Continued)

(58) Field of Classification Search
CPC .... A45D 20/00; D01D 46/0005; D01D 46/64; D01D 46/009; D01D 46/2403; D01D 46/44; D01D 2265/023
See application file for complete search history.

(56) References Cited

U.S. PATENT DOCUMENTS 3,265,075 A 8/1966 Edman et al.
3,953,710 A 4/1976 Dyer
(Continued)

FOREIGN PATENT DOCUMENTS

AU 2012101710 A4 1/2013
AU 2017208192 A1 8/2017
(Continued)

OTHER PUBLICATIONS

International Search Report and Written Opinion received for PCT Patent Application No. PCT/GB2021/050777, mailed on May 31, 2021, 10 pages.
(Continued)

*Primary Examiner* — Connor J Tremarche
(74) *Attorney, Agent, or Firm* — Tucker Ellis LLP; Michael G. Craig

(57) ABSTRACT

Disclosed is a hair care applianceincluding: a housing having a first end and a second end and a fluid inlet which extends around the housing and is proximate the first end of the housing, a fluid outlet, a fluid flow path extending within the housing between the fluid inlet and the fluid outlet. The fluid inlet is provided with a filtering system including a removable portion and a fixed portion. The removable portion includes a first part and a second part which are separable and wherein the first part can only be secured to the housing when the second part is attached to the first part. The first part may be a sleeve capable of sliding over the second part. The second part may include a tubular portion
(Continued)

and base portion extending radially out from the tubular portion at one end of the tubular portion.

17 Claims, 10 Drawing Sheets

(51) Int. Cl.
*B01D 46/24* (2006.01)
*B01D 46/44* (2006.01)
*B01D 46/64* (2022.01)

(52) U.S. Cl.
CPC ......... *B01D 46/2403* (2013.01); *B01D 46/44* (2013.01); *B01D 46/64* (2022.01); *B01D 2265/023* (2013.01)

(56) References Cited

U.S. PATENT DOCUMENTS

| | | | | |
|---|---|---|---|---|
| 4,254,324 | A | 3/1981 | Vrtaric | |
| 5,325,809 | A | 7/1994 | Mulle, Jr. | |
| 5,490,336 | A | 2/1996 | Smick et al. | |
| 6,715,215 | B1 | 4/2004 | Yeung | |
| 6,798,982 | B2 | 9/2004 | Ryu et al. | |
| 7,038,171 | B2 | 5/2006 | Osada et al. | |
| 8,028,437 | B2 | 10/2011 | Brown-Carter | |
| 8,601,713 | B2 | 12/2013 | Gaillard et al. | |
| 8,857,447 | B2 | 10/2014 | Heller | |
| 9,282,799 | B2 | 3/2016 | Courtney et al. | |
| 9,526,310 | B2 | 12/2016 | Courtney et al. | |
| 10,010,150 | B2 | 7/2018 | Courtney et al. | |
| D830,630 | S | 10/2018 | Chia et al. | |
| D848,675 | S | 5/2019 | Chia et al. | |
| 10,278,471 | B2 | 5/2019 | Shelton et al. | |
| D854,745 | S | 7/2019 | Chia et al. | |
| D856,579 | S | 8/2019 | Chia et al. | |
| D856,580 | S | 8/2019 | Chia et al. | |
| 10,575,617 | B2 | 3/2020 | Courtney et al. | |
| 2009/0188126 | A1 | 7/2009 | Gaillard et al. | |
| 2014/0208605 | A1* | 7/2014 | Yoshidome | A45D 20/10 34/97 |
| 2014/0261522 | A1 | 9/2014 | Smith | |
| 2014/0290087 | A1 | 10/2014 | Weatherly | |
| 2014/0345156 | A1 | 11/2014 | Sayers et al. | |
| 2015/0089828 | A1 | 4/2015 | Moloney et al. | |
| 2016/0166033 | A1* | 6/2016 | Kerr | A45D 20/12 34/97 |
| 2016/0235178 | A1 | 8/2016 | Atkinson et al. | |
| 2016/0338466 | A1 | 11/2016 | Atkinson et al. | |
| 2016/0367003 | A1 | 12/2016 | Stephens et al. | |
| 2018/0255896 | A1* | 9/2018 | Chia | A45D 20/12 |
| 2019/0116955 | A1* | 4/2019 | Atkinson | B01D 46/24 |
| 2019/0200720 | A1 | 7/2019 | Kerr et al. | |

FOREIGN PATENT DOCUMENTS

| | | | |
|---|---|---|---|
| CN | 201341553 | Y | 11/2009 |
| CN | 202146022 | U | 2/2012 |
| CN | 202407584 | U | 9/2012 |
| CN | 103393272 | A | 11/2013 |
| CN | 104244766 | A | 12/2014 |
| CN | 204742992 | U | 11/2015 |
| CN | 106165960 | A | 11/2016 |
| CN | 106256287 | A | 12/2016 |
| CN | 108272206 | A | 7/2018 |
| CN | 110464103 | A | 11/2019 |
| DE | 8715086 | U1 | 8/1988 |
| DE | 3906256 | A1 | 8/1990 |
| EP | 2086367 | B1 | 8/2010 |
| FR | 2907642 | A1 | 5/2008 |
| GB | 2399751 | A | 9/2004 |
| GB | 2487996 | A | 8/2012 |
| GB | 2497192 | A | 6/2013 |
| GB | 2518641 | A | 4/2015 |
| GB | 2538561 | A | 11/2016 |
| GB | 2539437 | A | 12/2016 |
| GB | 2560356 | A | 9/2018 |
| GB | 2567661 | B | 9/2020 |
| JP | 58-083905 | A | 5/1983 |
| JP | 58-154706 | U | 10/1983 |
| JP | 58-180105 | A | 10/1983 |
| JP | 58-180107 | A | 10/1983 |
| JP | 60-021205 | U | 2/1985 |
| JP | 60-215305 | A | 10/1985 |
| JP | 62-189005 | U | 12/1987 |
| JP | 01-075437 | U | 5/1989 |
| JP | 01-121502 | U | 8/1989 |
| JP | 2002-238649 | A | 8/2002 |
| JP | 2009-191990 | A | 8/2009 |
| JP | 2010-187454 | A | 8/2010 |
| JP | 2012020036 | A | 2/2012 |
| JP | 2013-075139 | A | 4/2013 |
| JP | 2014-139396 | A | 7/2014 |
| JP | 2018-149286 | A | 9/2018 |
| JP | 2019-055295 | A | 4/2019 |
| JP | 2019-076720 | A | 5/2019 |
| KR | 20190015640 | A | 2/2019 |
| WO | 2006/001657 | A1 | 1/2006 |
| WO | 2008/053099 | A2 | 5/2008 |
| WO | 2018/162878 | A1 | 9/2018 |
| WO | 2019/077301 | A1 | 4/2019 |
| WO | 2020/001742 | A1 | 1/2020 |

OTHER PUBLICATIONS

Search Report received for GB Application No. 2007215.3, mailed on Nov. 6, 2020, 1 page.
Office Action received for Japanese Patent Application No. 2022-569260, mailed on Oct. 17, 2023, 13 pages (6 pages of English Translation and 7 pages of Original Document).
Atkinson et al., U.S. Office Action dated May 21, 2020, directed to U.S. Appl. No. 16/164,083; 21 pages.
Chia et al., U.S. Office Action dated Mar. 9, 2020, directed to U.S. Appl. No. 15/914,413; 11 pages.
Final Rejection dated Feb. 3, 2020, directed to JP Application No. 2018-043084; 6 pages.
International Search Report and Written Opinion dated May 29, 2018, directed to International Application No. PCT/GB2018/050451; 12 pages.
International Search Report and Written Opinion dated Oct. 30, 2018, directed to International Application No. PCT/GB2018/052775; 11 pages.
Notification of Reason for Rejection dated Mar. 25, 2019, directed to JP Application No. 2018-043084; 7 pages.
Patent Evaluation Opinions in the Patent Evaluation Report dated Feb. 22, 2019, directed to Chinese Application No. 2018203294532; 9 pages.
Search Report dated Apr. 18, 2018, directed to GB Application No. 1717176.0; 1 page.
Search Report dated Jul. 25, 2017, directed to GB Application No. 1703764.9; 2 pages.
Translation of JPS5883905, accessed May 14, 2020 (Year: 1983).

* cited by examiner

HAIRCARE APPLIANCE

CROSS-REFERENCE TO PRIOR APPLICATION

This application is a § 371 National Stage Application of PCT International Application No. PCT/GB2021/050777 filed Mar. 29, 2021, which claims the priority of United Kingdom Application No. 2007215.3, filed May 15, 2020, each of which are herein incorporated by reference in their entirety.

TECHNICAL FIELD

This invention relates to a haircare appliance and in particular to a filter for a haircare appliance.

BACKGROUND

In a conventional hot styling appliance, air is drawn into an inlet by a fan unit and directed towards the hair by an outlet. Often, one appliance is provided with different attachments, each having a different outlet and thus a different function, for example drying, curling or volumising. Depending on the style desired, the air may or may not be heated. The attachment may include bristles onto which hair is wrapped and held for styling. Conventionally a filter is provided to filter fluid that enters the appliance to remove dust and hair.

Traditionally, hairdryers have a casing and a handle where the casing houses components such as the filter, fan unit and heater. Hair styling appliances in contrast are held by the casing.

It is known to provide multi layered filtering systems for example with grille having relatively large apertures and an inner filter having relatively small apertures. Often the grille is removable to enable cleaning of the inner filter, or even replacement of one of the layers of the filter in the event of damage. The grille can be friction fitted, twisted onto, mechanically attached or snapped onto a casing of the appliance.

Often, the appliance comprises a cable for supplying power in the vicinity of the fluid inlet and filter of the appliance. If the filter is removed for cleaning, it will still be retained on the cable and it is preferred to remove it from the cable. The present invention seeks to provide a filter which can be completely removed from the appliance for washing and replaced without compromising filtration.

SUMMARY

The invention provides a hair care appliance comprising: a housing having a first end and a second end and a fluid inlet which extends around the housing and is proximate the first end of the housing, a fluid outlet, a fluid flow path extending within the housing between the fluid inlet and the fluid outlet, wherein the fluid inlet is provided with a filtering system comprising a removable portion and a fixed portion wherein the removable portion comprises a first part and a second part which are separable and wherein the first part can only be secured to the housing when the second part is attached to the first part.

The first part may be a sleeve capable of sliding over the second part.

The second part may comprise a tubular portion and base portion extending radially out from the tubular portion at one end of the tubular portion.

The base portion may provide a circumferential ledge which engages with an end of the first part of the removable portion when the first part is connected to the second part.

The removable portion may be retained with respect to the fluid inlet via a magnetic coupling, wherein a first part of the magnetic coupling is housed within the base portion. The removable portion may be attached to the housing by sliding the removable portion over the fixed portion in a first direction.

The first part may be attached to the second part by sliding the first part over the second part in a second direction which is opposite to the first direction.

The second part may comprise a frame which surrounds and delimits one or more layers of filter media.

The fixed portion may comprise a filter mesh surrounded and supported by a mesh frame. The mesh frame may comprise a channel which forms a first piece of a mechanical coupling between the fixed portion and the removable portion.

The removable portion may comprise second and third pieces of the mechanical coupling between the fixed portion and the removable portion of the filtering system wherein the second and third pieces of the mechanical coupling are adapted to cooperate with the channel in the mesh frame.

The removable portion of the fluid inlet may have an open state and a closed state, wherein the removable portion can only be attached to the fixed portion it is in the closed state.

When the removable portion is removed from the fixed portion the second and third pieces of the mechanical coupling may be split into two sections. The first part of the removable portion may comprise the second piece of the mechanical coupling which comprises a housing to house a protrusion in a first section and a cooperating recess in a second section of the mechanical coupling. The second part of the removable portion may comprise the third piece of the mechanical coupling which comprises a connecting portion having one or more of a magnet or magnetisable material in both the first section and the second section.

The fluid inlet may further comprise a switch which senses the presence of the removable portion of the filtering system and allows activation of the appliance only when the removable portion of the filtering system is attached.

The switch may be a reed switch housed within the mesh frame which detects the third piece of the mechanical coupling closing a pair of electrical contacts when the removable portion of the filtering system is attached and opening the pair of electrical contacts when the removable portion of the filtering system is removed.

The appliance may be a hairdryer, a hair styling appliance, a hot styling brush or a straightening device having airflow.

BRIEF DESCRIPTION OF FIGURES

The invention will now be described, by way of example only, with reference to the accompanying drawings, in which.

DETAILED DESCRIPTION OF PARTICULAR EMBODIMENTS

Figure 1:
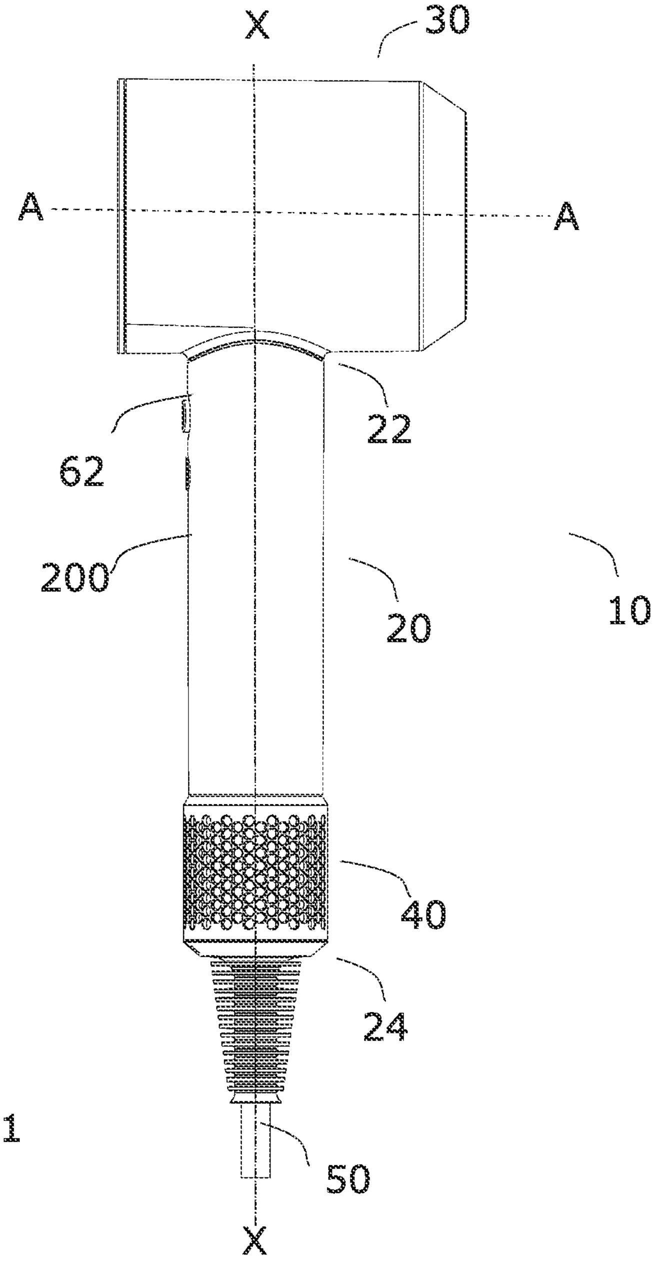
FIG. 1 shows a hairdryer having a removable filter.
Figure 2:
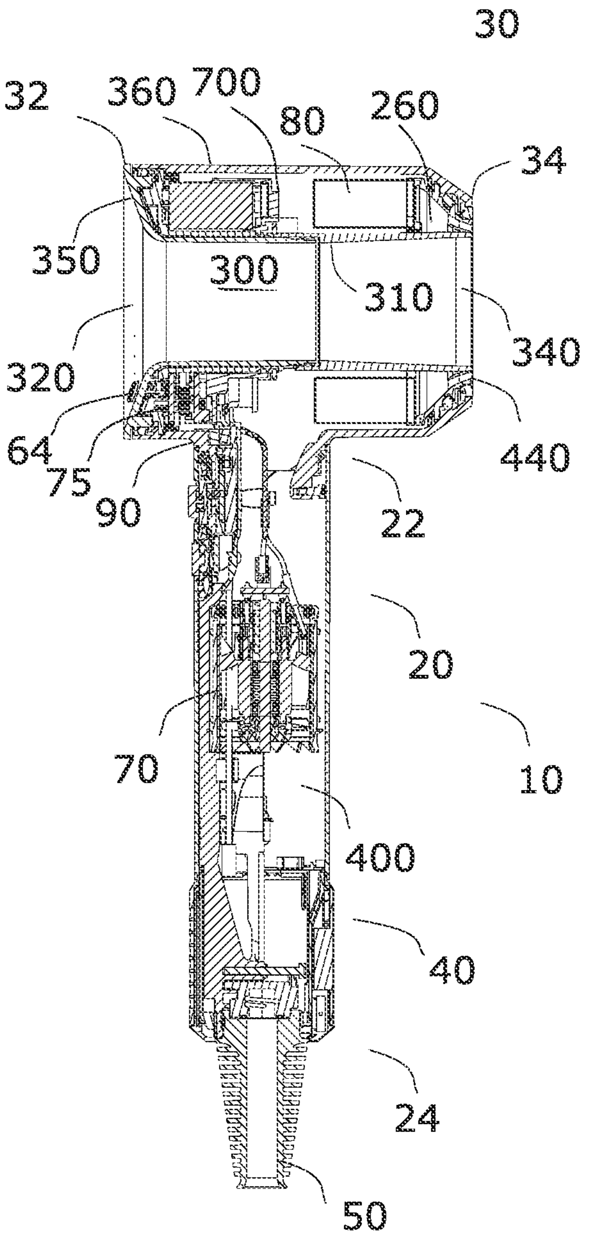
FIG. 2 shows a cross section through the hairdryer of FIG. 1.
Figure 3A:
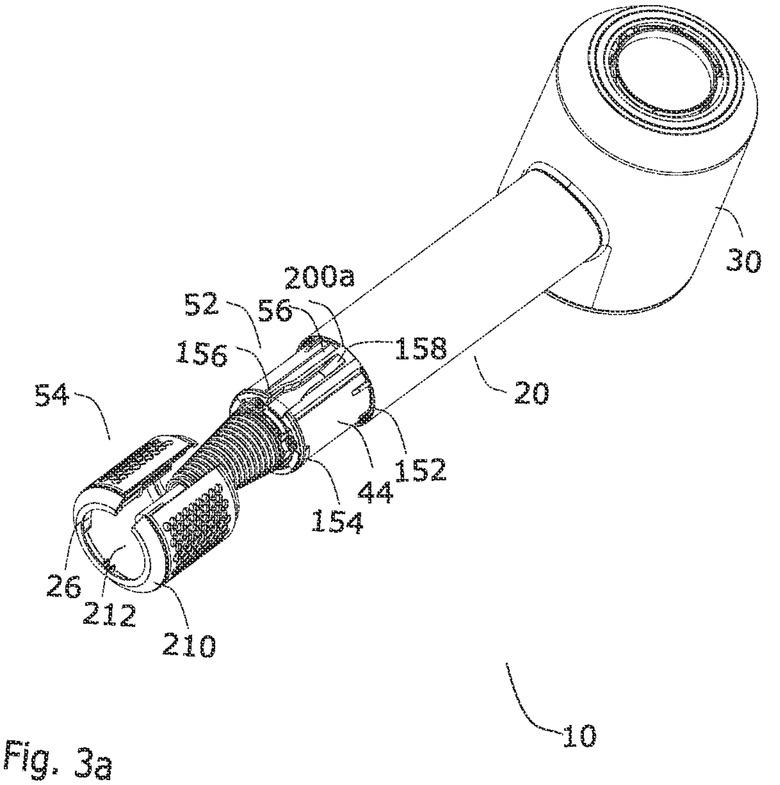
FIG. 3*a* shows an isometric view of the hairdryer with the removable portion of the fluid inlet removed.
Figure 3B:
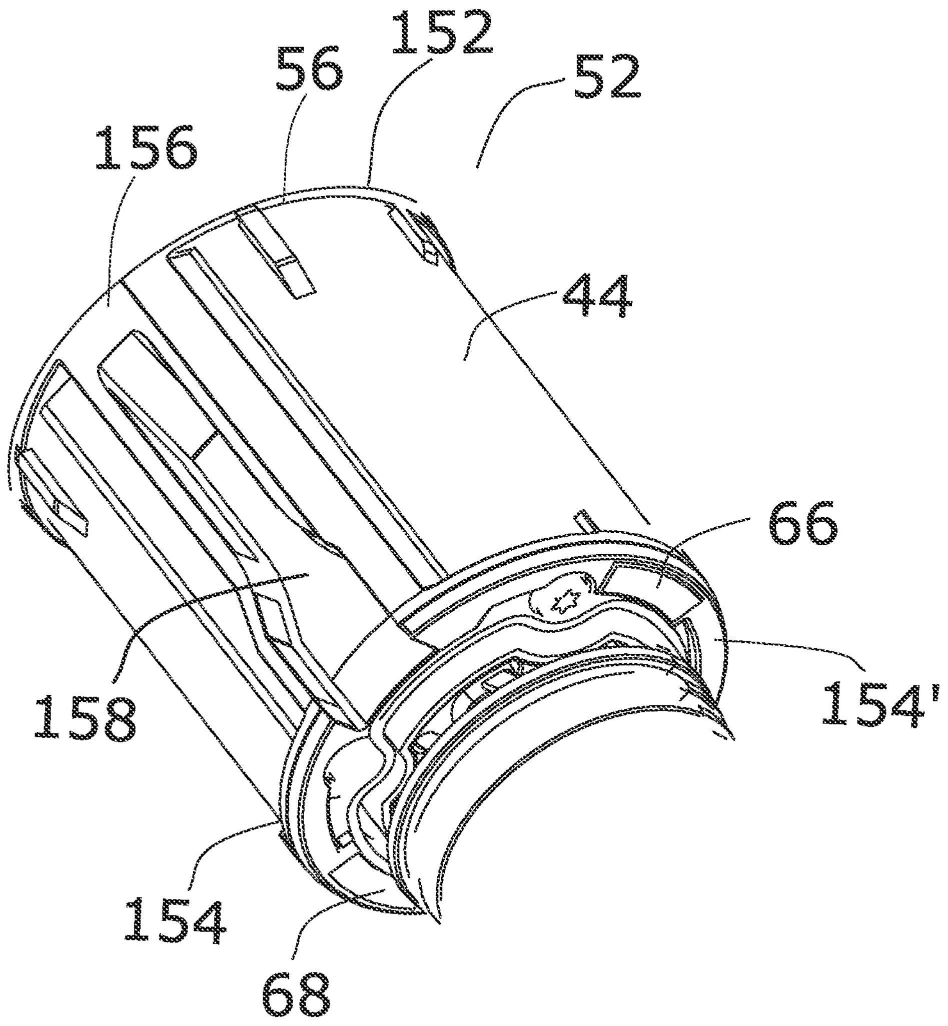
FIG. 3*b* is an enlarged partial view of the fluid inlet of FIG. 3*a;*

FIGS. 1, 2 and 3 show an example of hairdryer 10 with a handle 20 and a body 30. The handle has a first end 24 distal from the body 30 and which includes a primary fluid inlet 40 and a second end 22 which is connected to the body 30. Power is supplied to the hairdryer 10 via a cable 50. At a distal end of the cable 50 from the hairdryer 10 a plug (not shown) is provided, the plug may provide electrical connection to mains power or to a battery pack, for example. The primary fluid inlet 40 is provided with a filtering system which includes multiple layers of filtration. The filtering system includes a removable portion 54 and a fixed portion 52. The removable portion 54 can be removed by a user for cleaning and the fixed portion 52 can be accessed by a user for cleaning when the removable portion 54 has been removed.

Upstream of the primary fluid inlet 40, a fan unit 70 is provided. The fan unit 70 includes a fan and a motor. The fan unit 70 draws fluid through the primary fluid inlet 40 towards the body 30 through a primary fluid flow path 400 that extends from the primary fluid inlet 40 and into the body 30 where the handle 20 and the body 30 are joined 90. The body 30 has a first end 32 and a second end 34, the primary fluid flow path 400 continues through the body 30 towards the second end 34 of the body, around a heater 80 and to a primary fluid outlet 440 where fluid that is drawn in by the fan unit exits the primary fluid flow path 400. The primary fluid flow path 400 is non-linear and flows through the handle 20 in a first direction and through the body 30 in a second direction which is orthogonal to the first direction.

The body 30 includes an outer wall 360 and an inner duct 310. The primary fluid flow path 400 extends along the body from the junction 90 of the handle 20 and the body 30 between the outer wall 360 and the inner duct 310 towards the primary fluid outlet 440 at the second end 34 of the body 30.

An inner wall 260 extends within the outer wall 360. The inner wall 260 at least partially defines the primary fluid outlet 440 and extends from the second end 34 of the body 30 between the inner duct 310 and the outer wall 360.

Another fluid flow path is provided within the body; this flow is not directly processed by the fan unit or the heater but is drawn into the hairdryer by the action of the fan unit producing the primary flow through the hairdryer. This fluid flow is entrained into the hairdryer by the fluid flowing through the primary fluid flow path 400.

The first end 32 of the body includes a fluid inlet 320 and the second end 34 of the body includes a fluid outlet 340. Both the fluid inlet 320 and the fluid outlet 340 are at least partially defined by the inner duct 310 which is an inner wall of the body 30 and extends within and along the body. A fluid flow path 300 extends within the inner duct 310 from the fluid inlet 320 to the fluid outlet 340. At the first end 32 of the body 30, a side wall 350 extends between the outer wall 360 and the inner duct 310. This side wall 350 at least partially defines the fluid inlet 320. The primary fluid outlet 440 is annular and surrounds the fluid flow path.

A PCB (Printed Circuit Board) 75 including the control electronics for the hairdryer is located in the body 30 near the side wall 350 and fluid inlet 320. The PCB 75 is ring shaped and extends round the inner duct 310 between the inner duct 310 and the outer wall 360. The PCB 75 is in fluid communication with the primary fluid flow path 400. The PCB 75 extends about the fluid flow path 300 and is isolated from the fluid flow path 300 by the inner duct 310.

The PCB 75 controls parameters such as the temperature of the heater 80 and the speed of rotation of the fan unit 70. Internal wiring (not shown) electrically connects the PCB 75 to the heater 80 and the fan unit 70 and the cable 50. Control buttons 62, 64 are provided and connected to the PCB 75 to enable a user to select from a range of temperature settings and flow rates for example.

Downstream of the PCB 75, is the heater 80 and a PCB baffle 700 is provided between the PCB 75 and the heater 80. The PCB baffle provides thermal protection for the PCB 75 when the heater 80 switched on amongst other things.

In use, fluid is drawn into the primary fluid flow path 400 by the action of the fan unit 70, is optionally heated by the heater 80 and exits from the primary fluid outlet 440. This processed flow causes fluid to be entrained into the fluid flow path 300 at the fluid inlet 320. The fluid combines with the processed flow at the second end 34 of the body. In the example shown in FIG. 2, the processed flow exits the primary fluid outlet 440 and the hairdryer as an annular flow which surrounds the entrained flow that exits from the hairdryer via the fluid outlet 340. Thus fluid that is processed by the fan unit and heater is augmented by the entrained flow.

The body 30 is generally symmetrical about a longitudinal axis A-A which extends along the length of the body 30. The duct 310 and outer wall 360 are concentric as is the heater 80 located between the duct 310 and the outer wall 360.

The handle 20 has an outer wall 200 which extends from the body 30 towards the first end 24 of the handle. Adjacent the first end 24 of the handle 20, is the fixed portion 52 of the fluid inlet. The fixed portion 52 of the fluid inlet 40 has filter mesh 44 surrounded by and supported by a mesh frame 56. The filter mesh 44 is permanently fixed to the appliance and performs a number of functions. It serves as a structural finger guard preventing access into the appliance; it can be used as a flow velocity modifier to improve blocking rates and depth-loading of the upstream filter media; and serves as a final level of filtration, should any of the upstream layers be removed or damaged.

Mesh apertures in this embodiment are 80 to 500 microns in diameter with a preferred range of 200-300 microns. The filter mesh 44 can be cleaned by brushing or wiping For the embodiment described with respect to FIGS. 3*a* to 3*b*, the removable portion 54 is retained with respect to the fixed portion 52 of the fluid inlet 40 by mechanical and magnetic couplings. The fixed portion 52 includes the filter mesh 44 (FIG. 3) and a mesh frame 56 which supports the filter mesh 44 and provides a mechanical coupling for the removable portion 54 and houses magnets or magnetisable material 66, 68 for the magnetic attachment of the removable portion 54 of the fluid inlet 40 to the fixed portion 52.

The frame 56 has a first edge 152 and a second edge 154 which extend around the circumference of the filter mesh 44, the first edge 152 being located adjacent the distal end 200*a* of the outer wall and the second edge 154 being located adjacent the first end 24 of the handle. A connecting portion 156 extends longitudinally between the first edge 152 and the second edge 154. The connecting portion 156 provides a housing for a mechanical coupling between the fixed portion 52 and the removable portion 54 of the fluid inlet 40 which will be described later. The magnets or magnetisable material 66, 68 are provided in an end face 154' of the second edge 154 of the frame 56.

Figure 5:
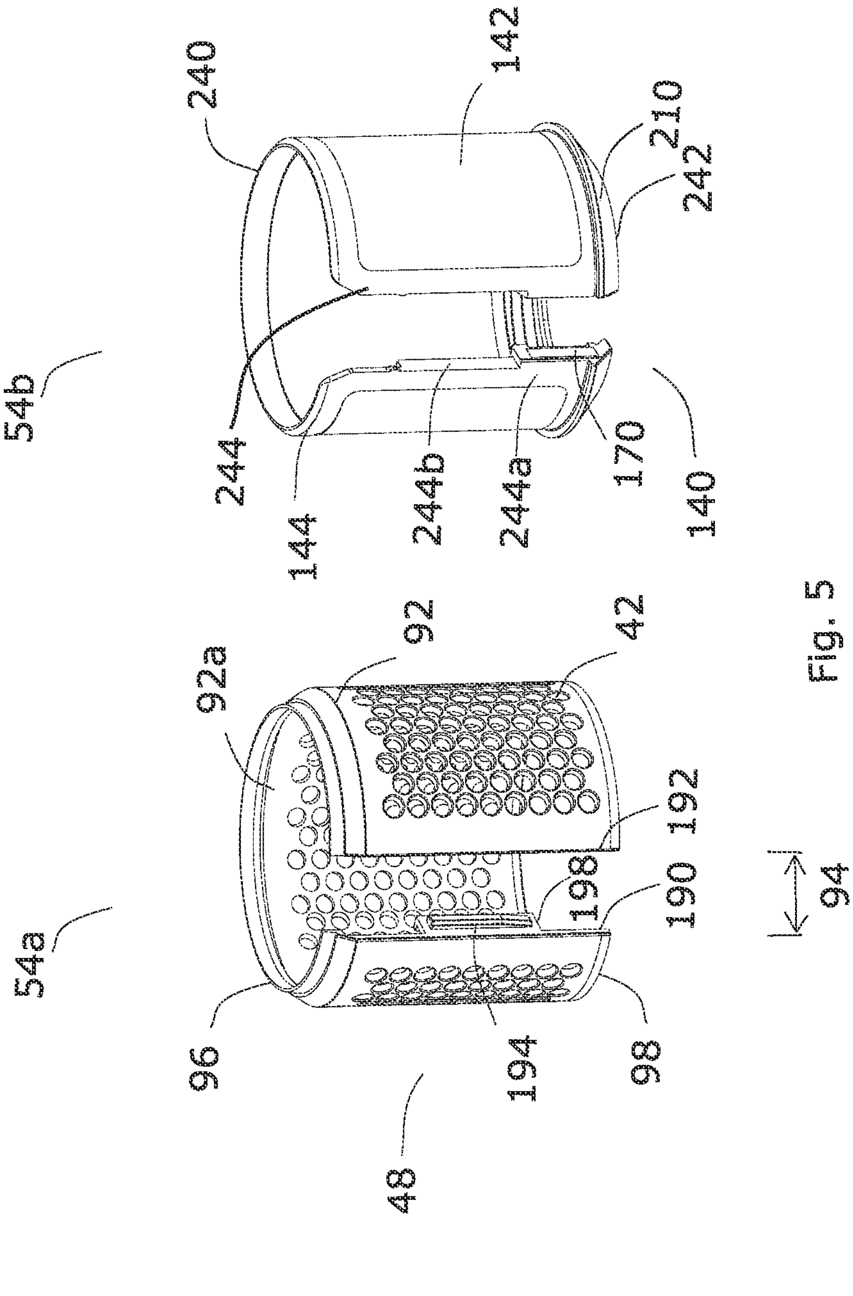
FIG. 5, shows isometric views of the removable portion of the fluid inlet when separated into the filter grille and intermediate layer

The removable portion 54 has two separable parts, a first part 54*a* comprises an outer layer formed by a filter grille 48 and a second part 54*b* which is an intermediate layer 140. Referring now to FIG. 5, the removable portion 54 includes a filter grille 48 and an intermediate layer 140 which includes a filter 142 and a supporting frame 144. The removable portion 54 can be removed for washing or replacement. The removable portion 54 has two states; open and closed. When in the closed state, a mechanical joint 60 is formed and the removable portion 54 can be attached to the fixed portion 52 of the fluid inlet 40. When in the open state, the mechanical joint is broken.

Figure 6A:
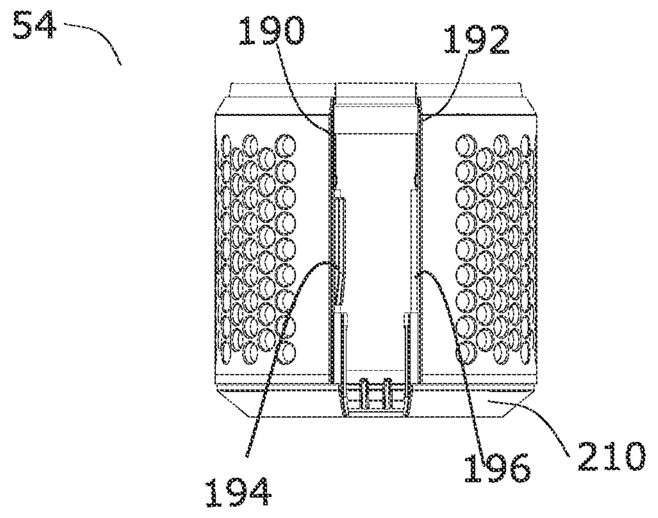
FIG. 6*a* shows a side view of a removable portion of the fluid inlet in the open state.
Figure 6B:
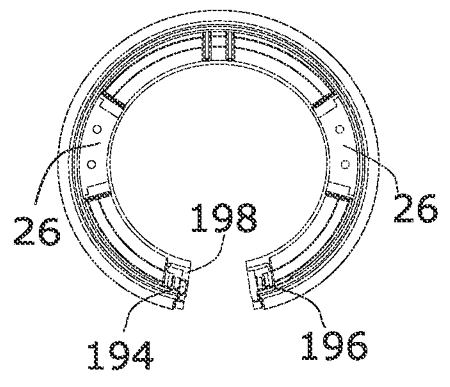
FIG. 6*b* shows a top view of a removable portion of the fluid inlet in the open state.
Figure 6C:
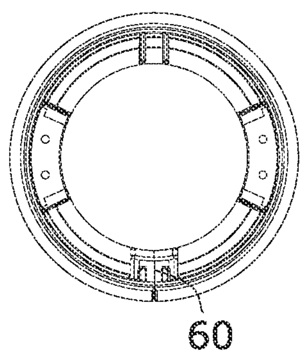
FIG. 6*c* shows a top view of the removable portion of the fluid inlet in the closed state.

The filter grille 48 has two states and is flexible; moulded from a plastic material in a first state, it is open in a natural, relaxed state. It has a wall 92 which is curved forming an open loop or C-shape and having end faces 190, 192 extending axially along the wall 92 which are separated by a gap 94 or break in the wall. The end faces 190, 192 extend along the wall between a first end 96 and a second end 98 of the wall. The first end 96 of the wall is adapted to engage with or abut the distal end 200*a* of the handle. In the second state, the filter grille 48is closed (FIG. 4*a*), the wall 92 forms a closed loop; the gap 94 is closed. The wall 92 has an array of apertures 42 that extend in a series of rows and/or columns around and along the wall 92. In addition, a mechanical joint 60 (FIG. 6*c*) extends longitudinally along the removable portion 54. The mechanical joint 60 is formed when the removable portion 54 is in the second state or forms a closed loop. In this embodiment, part of this mechanical joint is provided by the filter grille 48 and this assists in maintaining the circularity of the filter grille 48 in the closed state. One end face 190 is provided with a protrusion 194 and the other end face 192 is provided with a correspondingly sized recess 196 (FIG. 6*a*) forming a mortise and tenon joint. The protrusion 194 and recess 196 are located within a housing 198 which extends longitudinally along the filter grille 48 on both sides of the gap 94; this is partially formed along the first edge 190 and the second edge 192.

The filter grille 48 helps to prevent hair and other foreign objects from entering the primary fluid flow path 400 of the hairdryer and provides a coarse filtering stage; in this embodiment, the apertures 42 have a diameter of around 2.7 mm (2700 microns) and the filter grille is formed from a moulded thermoplastic.

The functions of the filter grille 48 include guarding the downstream filter media from direct user contact to prevent hand contact contamination and debris smearing, removing the largest particles from the airflow to which prolongs filter life and optimises blocking rates, and improve the cleanability of the downstream media. The filter grille 48 also conditions the flow rate and velocity distribution across the downstream filter media to optimise filter life & blocking rates, serves as a structural guard in general use to protect the downstream media and provides a separation between the pre-filter and downstream media helps reduce the flow restriction should the user hold the product directly on the pre-filter. The filter grille 48 forms part of the visual language of the product, is designed to have a low pressure loss across the filter and can serve to attenuate broadband and tonal sounds.

The intermediate layer 140 is also formed as an open loop, in a C-shape with a supporting frame 144 extending around the periphery of a filter 142. The filter 142 provides the majority if not all of the fine filtration of fluid that flows into the fluid inlet 40 and consists of a number of layers of filtering media. The intermediate layer 140 is sized to fit within the filter grille 48 and includes the magnetic coupling that retains the removable portion 54 with respect to the fixed portion 52 of the fluid inlet 40. The supporting frame 144 forms part of the mechanical coupling 60 between the removable portion 54 and the fixed portion 52. The supporting frame 144 has a first edge 240 and a second edge 242 which extend around the circumference of the intermediate layer 140, the first edge 240 being located adjacent the distal end 200*a* of the outer wall and the second edge 242 being located adjacent the first end 24 of the handle when the intermediate layer 140 is attached to the appliance 10. A connecting portion 244 extends longitudinally between the first edge 240 and the second edge 242 and is formed in two parts when the intermediate layer 140 is in an open state. The connecting portion 244 has multiple functions. A first section 244*a* forms part of the mechanical joint 60 formed when the removable portion 54 is in a closed state and a second section 244*b* is shaped to accommodate some features of the filter grille 48, which will be described in detail later.

The intermediate layer includes an end wall 210 of the fluid inlet 40. The end wall 210 has three main functions: it provides a central aperture through which the cable 50 enters the appliance; it provides a circumferential ledge onto which the filter grille 48 rests; and it provides housings for a pair of magnets or magnetisable material 26, 28 that forms one part of a magnetic coupling with the fixed portion 52 of the fluid inlet 40. This means that the filter grille 48 cannot be retained with respect to the fixed portion 52 unless the intermediate layer 140 is in position within the filter grille 48. There is no direct connection between the filter grille 48 and the fixed portion 52. If a user attempts to attach the filter grille 48 to the fixed portion 52 without inclusion of the intermediate layer 140 it simply falls away.

The cable 50 enters the hairdryer through an aperture 212 in the end wall 210. The cable 50 is located approximately in the middle of the end wall 210 so extends from the centre of the handle 20. The handle 20 has a longitudinal axis X-X along which the outer wall 200 extends from the body 30 towards the first end 24.

The removable portion 52 is washable by hand or a dishwasher so anything that is retained by the removable portion can be relatively easily cleaned off and any apertures that are blocked can be cleaned from both the outside and the inside so the effectiveness of the cleaning is high. The fixed portion 54, comprising the inner grille 44 in contrast can only be accessed from the outside surface so any cleaning is less effective.

The end wall 210 is co-moulded with the supporting frame 144 and in this embodiment the connecting portion 244 is adjacent the end wall 210. The first section 244*a* of the connecting portion 244 forms part of the mechanical joint 60 of the removable part 54 when in a closed state. The first section 244*a* of the connecting portion can be considered a third piece of the mechanical coupling.

In this embodiment both the filter grille 48 and the intermediate layer 140 each form a part of the mechanical joint 60. Each part is longitudinally spaced along the length of the removable portion 54. The first section 244*a* of the connecting portion 244 of the intermediate layer 140 is provided adjacent the end wall 210 and extends towards the first edge 240. The filter grille 48 comprises a housing 198 which abuts the connecting portion 244 at a first end when removable portion 54 is intact and extends towards the first end 96 of the wall of the filter grille 48. The housing 198 is conveniently located approximately mid-way along the length of the filter grille 48 as this assists most in maintaining circularity. The housing 198 is generally rectangular and sized to enable the protrusion 194 fit within recess 196; it does not extend to obscure or cover any of the apertures 42 of the filter grille. The second section 244*b* of the connecting portion 244 of the intermediate layer 140 is shaped to accommodate the housing 198. The connecting portion 244 is "L-shaped" with the first section 244*a* comprising the leg part and physically touching when the intermediate layer 140 is in the closed state and the second section 244*b* comprising the upstanding part having a gap sized to accommodate the housing 198 when the intermediate layer 140 is in the closed state.

In order to retain the removable portion 54 in a closed configuration a magnetic coupling 170 is used. Either a pair of magnets or one magnet and one piece of magnetisable material are located on each side of the connecting portion 244. The magnetic coupling 170 is housed in appropriately sized recesses 172 provided in the connecting portion 244. When the magnetic coupling 170 is brought together, the connecting portion 244 connects forming a closed loop. When the filter grille 48 is attached to the intermediate layer 140, the second part 244*b* of the connecting portion 244 engages with the housing 198 and closes the gap 94 causing the protrusion 194 to engage with the recess 196. This forms the second piece of the mechanical joint 60 which can then engage with the fixed part 52 of the filtering system. The engagement and disengagement of the magnetic coupling 170 allows the closing and opening of the removable portion 54 of the filtering system respectively. The mechanical and magnetic couplings can be broken and reformed by hand.

The mechanical joint 60 provides a means for the filter grille 48 and intermediate layer 140 to be retained mechanically with respect to the fixed portion 52 of the filtering system. The mechanical joint 60 provides a rectangular extension within the filter grille 48 and the intermediate layer 140; the mechanical joint 60 extends radially inwards from an inner surface 92*a* of the wall 92 and the supporting frame 144. The connecting portion 156 of the fixed portion 52 of the fluid inlet 40 includes a slot 158 which is adapted to retain the mechanical joint 60 when the removable portion 54 is attached to the handle 20. The connecting portion156 can be considered to be the first piece of the mechanical joint 60 and is formed as a channel in the mesh frame.

Figure 4C:
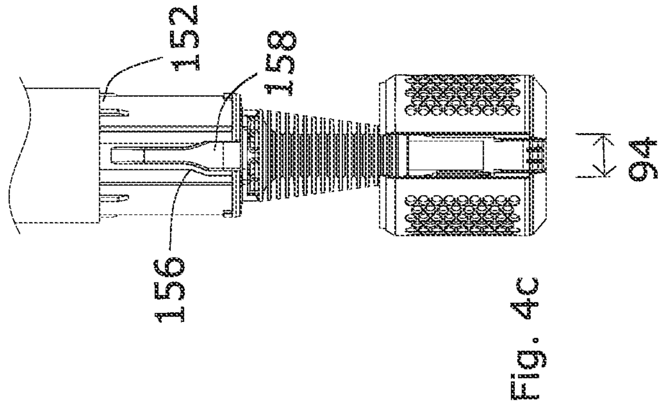
FIGS. 4*a*, 4*b* and 4*c* show the inlet of a hairdryer with the removable portion of the fluid inlet in various stages of removal.
Figure 4B:
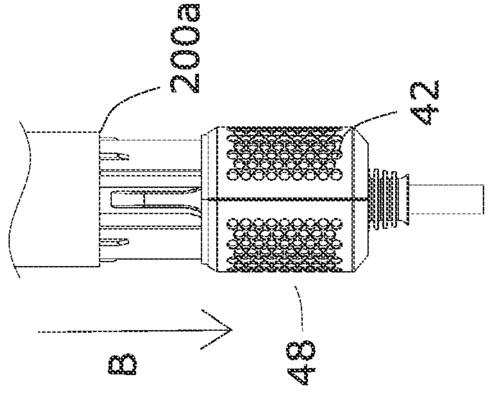
Figure 4A:
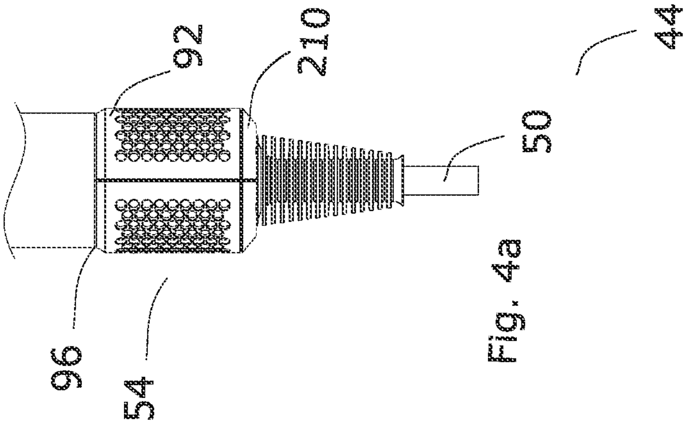

Referring now to FIGS. 4*a* to 4*c*, the removable portion 54 is initially attached to the appliance and collects hair and contaminants from the surrounding air when the appliance is turned on. Over time, some blocking of the apertures 42 of the filter grille 48 and the intermediate layer 140 will occur which could affect the overall performance of the appliance. The appliance may include an indicator which informs a user that the performance of the appliance has reduced and the filtering system should be checked for blockage. This indicator may be visual i.e. a lit LED or mechanical e.g. haptic feedback causing vibration of the handle of the appliance.

The removable portion 54 of the filtering system is removed from the fixed portion 52 by sliding the removable portion 54 longitudinally away from the outer wall 200 of the handle 20 in the direction indicated by arrow B. Once the mechanical joint 60 has disengaged from the slot 158, the removable portion 54 (comprising the filter grille 48 and the intermediate layer 140) can be removed from the cable. The magnetic coupling 170 is broken which places the intermediate layer 140 and filter grille 48 into an open state i.e. open with a gap 94 formed between opposite end faces 190, 192 of the wall 92. The gap 94 together with the flexible nature of the removable portion 52 enables it to be disengaged from the cable 50 for washing either by hand or using a dishwasher.

Figure 7A:
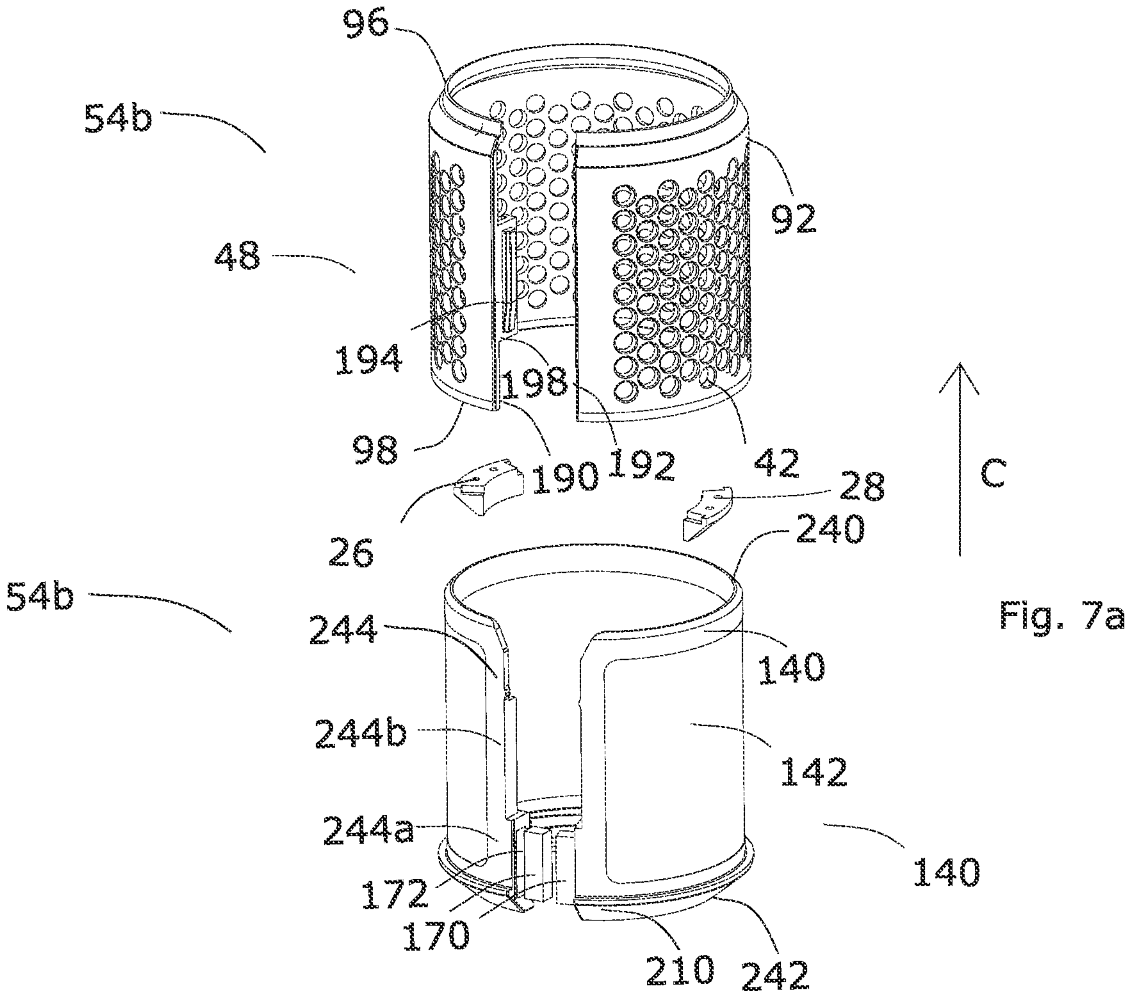
FIGS. 7*a* and 7*b* show two exploded isometric views of a filter grille.

Once the removable portion 54 is removed from the cable 50, the intermediate layer 140 is disengaged from the filter grille 48 by relative linear movement between the two parts. The filter grille 48 moves away from the end wall 210 until it can be separated from the intermediate layer 140. The disengagement of the filter grille 48 from the intermediate layer 140 is in the opposite direction to the disengagement of the removable portion 54 from the fixed portion 52 as indicated by arrow C (FIG. 7*a*). This process can be undertaken with the magnetic coupling engaged or disengaged. Both parts of the removable portion 54 can be washed by hand or in a dishwasher to remove ingress. The filter grille 48 can be considered a sleeve capable of sliding over the intermediate layer 140 until it engages with the end wall 210. The intermediate layer 140 can be considered to comprise a tubular portion with the end wall 210 being a base portion which extends radially out from the tubular portion at one end of the tubular portion. The base portion has a circumferential ledge which engages with an end of the filter grille when it is connected to the intermediate layer.

In the embodiment described in FIGS. 3 to 8, the magnetic attachment of the removable portion 54 to the fixed portion 52 is formed from a pair of magnets 26, 28 which are housed in the end wall 210 of the intermediate layer 140 and a second pair of magnets 66, 68 provided in the frame 56 of the fixed portion 54. Both pairs of magnets 26, 28 and 66, 68 are radially spaced from the mechanical joint 60 and ideally are located diametrically opposite each other to give an even force either side of the mechanical joint 60.

The skilled person will understand that one of each of the pair of magnets 26, 28 and 66, 68 may be replaced with a magnetisable material.

The connecting portion 156 of the frame 56 is wider or extends across a greater proportion of the circumference of the fixed portion 54 than the mechanical joint 60. This is to ensure that any stray fluid that could be pulled in through the mechanical joint 60 is filtered by the filter mesh 44.

In this embodiment, the filter grille 48 is made from a thermoplastic material such as PET, however this is not essential. Alternatives include, but are not limited to a perforated (for example by etching, stamping, drilling, moulding or laser-cutting) a thermoplastic, thermoset, rubber, aluminium, ceramic or steel filter grille. The thickness of the filter grille can be 0.05 mm to 6 mm thick, with apertures having openings of 0.04 mm to 10 mm of any shape with an open area of 5% to 80%. The apertures may be in a regular array, randomly located, of constant or varying density along and around the filter grille. The grille can be any orientation relative to the airflow, including any form of 3D shaping e.g. conical, round, flat or pleated or any combination thereof to maximise face area. A coating or embedded additive may be applied with hypdrophobic, oleophobic, omniphobic or low surface energy characteristics for ease of cleaning.

Figure 7B:
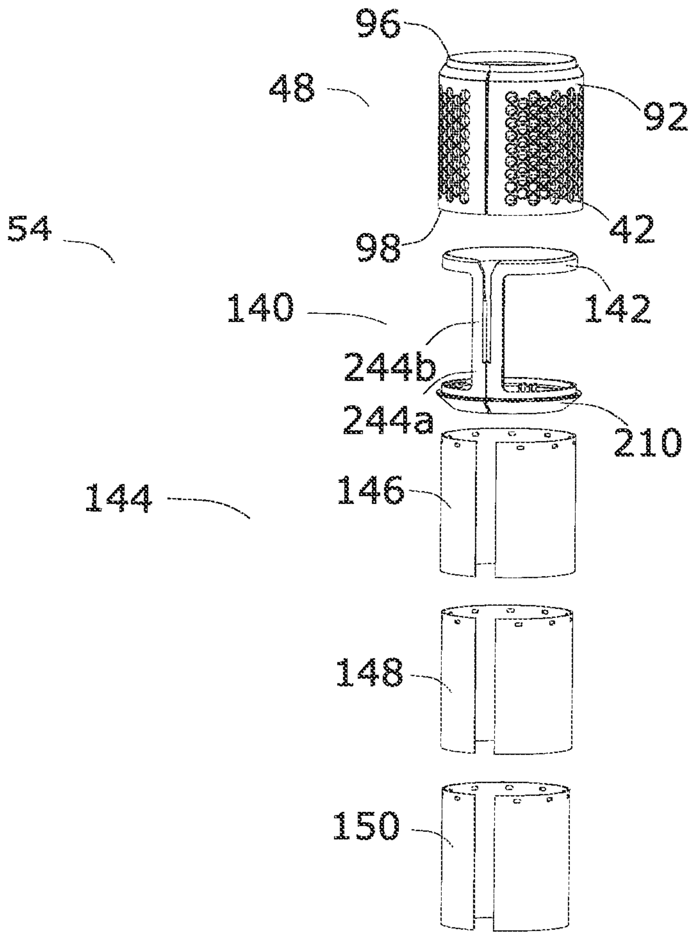
Figure 8:
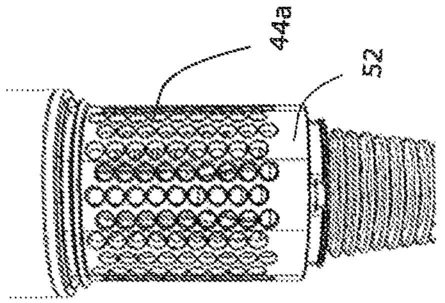
FIG. 8 shows an alternative embodiment for the fixed portion of the fluid inlet according to the invention.

Referring now to FIG. 7*b* the intermediate filter 144 will be described in more detail. In this embodiment, the intermediate filter 144 is formed from three layers of filtering media. In this embodiment, the inner layer 150 and outer layer 146 comprise a 600 micron pore nylon mesh, with the encapsulated central layer 148 being made from a 0.8 mm thick 3D non-woven 20GSM M5 filter classification item reference HF110/4 from Haerdi.

The intermediate layer 140 has a number of functions or desirable properties. A first function is to limit the quantity of long and short hairs that can pass through the media, either by means of sieving, friction (convoluted path), probabilistic methods or electrostatics and to limit the amount of fibrous debris that can enter the product i.e. any debris that is sufficiently large to get trapped internally and serve as the nucleation site for additional build up or get caught in moving components (e.g. fan of the fan unit). A second function is to limit the probability of viscous liquid contaminants (e.g. hairspray, hair serums etc.) in combination with suspended particulates (e.g. skin cells) from having sufficient surface tension to form blockages over the individual filter apertures, thereby adversely affecting the blocking rate of the filter media. To have a generally low particulate filtration efficiently, or as low as the product can withstand over it's design life, in order to minimise the rate of filter blockage. This increases the time until a cleaning process is required. To limit the likelihood of fibrous media becoming entangled and difficult to remove from the filter. To be easy to clean using readily available surfactants, water and tools in a salon. To capture sufficient debris such that it is visibly dirty to the naked eye before any perceivable loss in performance. To be robust enough to withstand multiple cleaning cycles using mechanical means of debris removal. To have a low initial pressure loss across the filter and to attenuate broadband and tonal sounds.

In the embodiment described in detail, three distinct layers of filtering media are used. However, this is just one example, the multiple layers can comprise seven or more layers which are tailored to the appliance. The multiple layers can be either physically separate media types or combined into one layer of gradiated media typically comprising: inner and outer layers, serving as an encapsulant for assembly and robustness purposes. The upstream or outer layer also serves as a second pre-filter (the filter grille 48 is considered a first pre-filter), improving both cleanability and blocking rate. The Downstream or inner layer additionally serves as a flow velocity modifier to improve the depth loading performance and cleanability of the filter. The central layer(s) which are encapsulated central layers are typically a depth-loading media type or layered meshes, serving as the main filter media.

Examples of filter media that can be used for a pre-filter layer i.e. the filter grille (in addition to the ones listed above) or the upstream or outer layer of the intermediate layer or for an encapsulated central layer or for a downstream or inner layer include, but is not limited to the following: a woven, spunbond, spunlaid or meltblown mesh or fleece in thermoplastic, thermoset, ePTFE, glass, aluminium, ceramic or steel which may be post-processed by heat-treatment, rolling (calendered) and/or sintered having a thickness of 0.02 mm to 6 mm with apertures having openings of 0.04 mm to 10 mm size of any shape and having 5% to 80% open area. The weight is ideally 20 to 165 GSM, with a strand diameter of 0.01 mm to 2 mm. The media density and pore size can be regular or random in nature and can be gradiated. Each layer can be single or multi-material and can be disposed in any orientation relative to the airflow, including any form of 3D shaping e.g. conical, round, flat or pleated or any combination thereof to maximise face area. A coating or embedded additive may be applied with hypdrophobic, oleophobic, omniphobic or low surface energy characteristics for ease of cleaning. The filter media may be processed to cause anti-static or electrostatic properties. Alternatively, the filter media used can be an open cell foam or wool in any available material including but not limited to PU, PP, PET, Silicone, AL, Kevlar, Steel or natural fibres having an thickness of 0.2 mm to 6 mm with a pore size of 0.1 mm to 3 mm. Again a coating or embedded additive may be applied with hypdrophobic, oleophobic, omniphobic or low surface energy characteristics for ease of cleaning.

The reasoning behind the filtration media options is for fine particles to be captured within the fluid inlet without causing the filter to clog quickly. Thus, as much matter is collected without impairing performance of the appliance before a cleaning process must be carried out.

Figure 9:
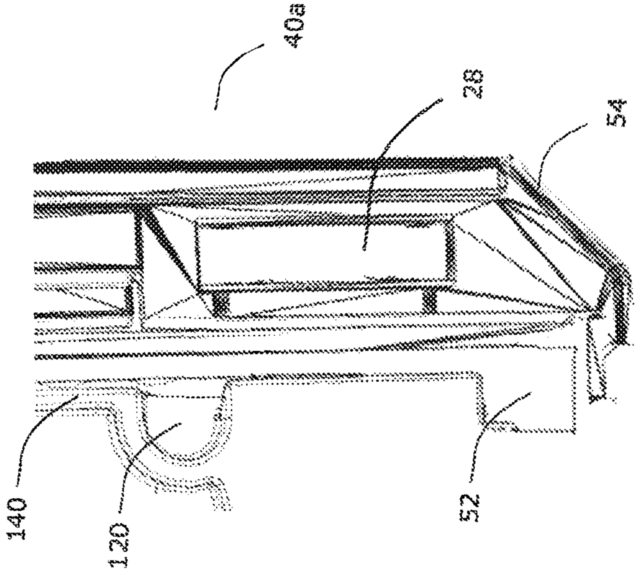
FIG. 9 shows a sensing arrangement for sensing the removable part of the filter.

In the embodiment described up to now, the appliance can be operated when the removable portion is removed from the appliance. For this reason, the mesh has to filter fine particles as well as act as a filter guard. In other embodiments, see FIGS. 8 and 9 the filter mesh 44*a* has much bigger openings. This is because this fluid inlet 40*a* includes a switch 120 which detects the presence of the removable portion 54. An electric switch, such as a reed switch 120 is housed in the fixed portion 52, perhaps overmoulded into the supporting frame 140 and the reed switch 120 prevents operation of the appliance until a magnet or magnetisable material 26, 28 in the removable portion 54 nears the switch and causes electrical contacts in the reed switch to close which enables activation of the appliance. If the removable portion 54 is removed whilst the appliance is activated the electrical contacts of the reed switch will open again and the appliance will stop functioning.

Another parameter of this multi-layered filtration system is air gaps between the separation between the filter mesh and the radially inner surface of the removable portion and between the radially outer surface of the intermediate layer and the filter grille. Gaps of 0 to 4 mm have been investigated and for the purposes of the specific filtration system used 0.73 mm was found to be optimal. Air gaps between the different layers serve as an additional tool to modify the flow velocity characteristics, optimising both blocking rate and pressure-drop across the filter media.

The invention has been described in detail with respect to a hairdryer however, it is applicable to any appliance that draws in a fluid and directs the outflow of that fluid from the appliance.

The fluid that flows through the appliance is generally air, but may be a different combination of gases or gas and can include additives to improve performance of the appliance or the impact the appliance has on an object the output is directed at for example, hair and the styling of that hair.

The invention is not limited to the detailed description given above. Variations will be apparent to the person skilled in the art.

The invention claimed is:

1. A hair care appliance comprising:

a housing having a first end and a second end and a fluid inlet which extends around the housing and is proximate the first end of the housing, a fluid outlet, a fluid flow path extending within the housing between the fluid inlet and the fluid outlet, wherein the fluid inlet is provided with a filtering system comprising a removable portion and a fixed portion wherein the removable portion comprises a first part and a second part which are separable and wherein the first part can only be secured to the housing when the second part is attached to the first part wherein the first part is a sleeve capable of sliding over and surrounding the second part.

2. The appliance according to claim 1, wherein the second part comprises a tubular portion and base portion extending radially out from the tubular portion at one end of the tubular portion.

3. The appliance according claim 2, wherein the base portion provides a circumferential ledge which engages with an end of the first part of the removable portion when the first part is connected to the second part.

4. The appliance according to claim 3, wherein the removable portion is retained with respect to the fluid inlet via a magnetic coupling, wherein a first part of the magnetic coupling is housed within the base portion.

5. The appliance according to claim 1, wherein the removable portion is attached to the housing by sliding the removable portion over the fixed portion in a first direction.

6. The appliance according to claim 5, wherein the first part is attached to the second part by sliding the first part over the second part in a second direction which is opposite to the first direction.

7. The appliance according to claim 1, wherein the second part comprises a frame which surrounds and delimits one or more layers of filter media.

8. The appliance according to claim 1, wherein the fixed portion comprises a filter mesh surrounded and supported by a mesh frame.

9. The appliance according to claim 8, wherein the mesh frame comprises a channel which forms a first piece of a mechanical coupling between the fixed portion and the removable portion.

10. The appliance according to claim 9, wherein the removable portion comprises second and third pieces of the mechanical coupling between the fixed portion and the removable portion of the filtering system wherein the second and third pieces of the mechanical coupling are adapted to cooperate with the channel in the mesh frame.

11. The appliance according to claim 1, wherein the removable portion of the fluid inlet has an open state and a closed state, wherein the removable portion can only be attached to the fixed portion it is in the closed state.

12. The appliance according to claim 11, wherein when the removable portion is removed from the fixed portion, a second piece and third piece of a mechanical coupling can be split into two sections.

13. The appliance according to claim 11, wherein the first part of the removable portion comprises a second piece of a mechanical coupling which comprises a housing to house a protrusion in a first section and a cooperating recess in a second section of the mechanical coupling.

14. The appliance according to claim 13, wherein the second part of the removable portion comprises a third piece of the mechanical coupling which comprises a connecting portion having one or more of a magnet or magnetisable material in both the first section and the second section.

15. The appliance according to claim 14, wherein fluid inlet further comprises a switch which senses the presence of the removable portion of the filtering system and allows activation of the appliance only when the removable portion of the filtering system is attached.

16. The appliance according to claim 15, wherein the switch is a reed switch housed within the mesh frame which detects the third piece of the mechanical coupling closing a pair of electrical contacts when the removable portion of the filtering system is attached and opening the pair of electrical contacts when the removable portion of the filtering system is removed.

17. The appliance according to claim 1, wherein the appliance is a hairdryer, a hair styling appliance, a hot styling brush or a straightening device having airflow.

* * * * *